(12) United States Patent
Ho

(10) Patent No.: US 11,280,446 B2
(45) Date of Patent: Mar. 22, 2022

(54) PIVOTAL SUPPORTING DEVICE FOR REMOTE MEMBER

(71) Applicant: Oxti Corporation, Taipei (TW)

(72) Inventor: Chih Feng Ho, Taipei (TW)

(73) Assignee: OXTI CORPORATION, Taipei (TW)

( * ) Notice: Subject to any disclaimer, the term of this patent is extended or adjusted under 35 U.S.C. 154(b) by 0 days.

(21) Appl. No.: 16/596,798

(22) Filed: Oct. 9, 2019

(65) Prior Publication Data

US 2021/0108757 A1    Apr. 15, 2021

(51) Int. Cl.
*F16M 11/08* (2006.01)
*F16M 11/20* (2006.01)
*F16M 11/22* (2006.01)

(52) U.S. Cl.
CPC ......... *F16M 11/08* (2013.01); *F16M 11/2014* (2013.01); *F16M 11/22* (2013.01); *F16M 2200/021* (2013.01); *F16M 2200/066* (2013.01)

(58) Field of Classification Search
CPC combination set(s) only.
See application file for complete search history.

(56) References Cited

U.S. PATENT DOCUMENTS

| | | | |
|---|---|---|---|
| 6,012,693 A | 1/2000 | Voeller et al. | |
| 6,315,259 B1 | 11/2001 | Kolb | |
| 6,394,403 B1 | 5/2002 | Hung | |
| 6,478,275 B1 | 11/2002 | Huang | |
| 6,769,657 B1 | 8/2004 | Huang | |
| 6,822,857 B2 | 11/2004 | Jung et al. | |
| 6,863,252 B2 | 3/2005 | Bosson | |
| 7,142,415 B2 * | 11/2006 | Hillman | F16M 11/10 361/679.06 |
| 7,195,215 B2 * | 3/2007 | Lin | F16M 11/2014 248/125.9 |
| 7,232,098 B2 * | 6/2007 | Rawlings | F16M 11/041 248/121 |
| 7,349,203 B2 * | 3/2008 | Jobs | F16M 11/14 248/160 |
| 7,413,152 B1 | 8/2008 | Chen | |
| 7,866,615 B2 * | 1/2011 | Hsuan | F16M 11/041 248/188.8 |
| 8,823,883 B2 * | 9/2014 | Kim | F16M 11/00 348/825 |
| 10,844,996 B2 * | 11/2020 | Hasegawa | F16M 11/08 |
| 2008/0258030 A1 * | 10/2008 | Hsuan | F16M 11/2092 248/346.03 |

(Continued)

*Primary Examiner* — Monica E Millner
(74) *Attorney, Agent, or Firm* — Browdy and Neimark, PLLC

(57) ABSTRACT

A pivotal supporting system includes a pivotal supporting device disposed on a supporting base for supporting a remote member on the supporting base, the pivotal supporting device includes a housing having two apertures, a shank engaged into the housing and includes two pathways aligned with the apertures of the housing, the pathways of the shank include arc lengths different from each other, two spring biasing members are engaged onto the housing and each include a tongue engaged into the apertures of the housing for engaging with the pathways of the shank, and a control ferrule is rotatably engaged onto the housing and includes two protrusions for forcing the tongues of the spring biasing members to engage with the pathways of the shank.

11 Claims, 9 Drawing Sheets

(56) References Cited

U.S. PATENT DOCUMENTS

| | | | |
|---|---|---|---|
| 2012/0199711 A1* | 8/2012 | Tsai | F16M 13/022 248/220.22 |
| 2016/0143167 A1* | 5/2016 | Tseng | G02F 1/133308 361/679.01 |
| 2018/0172201 A1* | 6/2018 | Kim | F16M 11/18 |
| 2018/0372261 A1* | 12/2018 | Vlaar | F16M 11/24 |

* cited by examiner

PIVOTAL SUPPORTING DEVICE FOR REMOTE MEMBER

BACKGROUND OF THE INVENTION

1. Field of the Invention

The present invention relates to a pivotal supporting device for a remote member, such as a monitor, displayer, portable phone, television, keyboard, or the like, and more particularly to a pivotal supporting device including an adjustable structure or configuration for adjusting and/or limiting the pivotal movement of the remote member and the pivotal supporting device relative to the supporting base.

2. Description of the Prior Art

Various kinds of typical supporting devices or apparatuses have been developed and provided for supporting a remote member, such as a monitor, displayer, portable phone, television, keyboard, or the like.

For example, U.S. Pat. No. 6,012,693 to Voeller et al., U.S. Pat. No. 6,315,259 B1 to Kolb, U.S. Pat. No. 6,394,403 B1 to Hung, U.S. Pat. No. 6,478,275 B1 to Huang, U.S. Pat. No. 6,769,657 B1 to Huang, U.S. Pat. No. 6,822,857 B2 to Jung et al., U.S. Pat. No. 6,863,252 B2 to Bosson, and U.S. Pat. No. 7,413,152 B1 to Chen disclose several of the typical supporting devices or apparatuses for supporting a remote member.

However, the typical supporting devices normally comprise a structure or configuration that may not be adjusted and/or limited to pivot relative to the supporting base.

The present invention has arisen to mitigate and/or obviate the afore-described disadvantages of the conventional pivotal supporting devices.

SUMMARY OF THE INVENTION

The primary objective of the present invention is to provide a pivotal supporting device including an adjustable structure or configuration for adjusting and/or limiting the pivotal movement of the remote member and the pivotal supporting device relative to the supporting base.

In accordance with one aspect of the invention, there is provided a pivotal supporting system comprising a supporting base, and a pivotal supporting device disposed on the supporting base for supporting a remote member on the supporting base, the pivotal supporting device includes a housing engaged onto the supporting base, the housing including a first aperture and a second aperture formed in the housing, a shank engaged into the housing, and the shank including a first pathway and a second formed in the shank and aligned with the first and the second apertures of the housing respectively, the first pathway of the shank including an arc length different from an arc length of the second pathway of the shank, a first spring biasing member engaged onto the housing, and the first spring biasing member including a first tongue engaged into the first aperture of the housing for engaging with the first pathway of the shank, a second spring biasing member engaged onto the housing, and the second spring biasing member including a second tongue engaged into the second aperture of the housing for engaging with the second pathway of the shank, and a control ferrule rotatably engaged onto the housing, and the control ferrule including a first protrusion for engaging with the first spring biasing member and for forcing the first tongue of the first spring biasing member to engage with the first pathway of the shank, and the control ferrule including a second projection for engaging with the second tongue of the second spring biasing member and for forcing the second tongue of the second spring biasing member to engage with the second pathway of the shank and to control and guide or limit the shank to pivot or rotate relative to the barrel and/or the housing.

The housing includes a peripheral track formed in the housing, and the control ferrule includes at least one protrusion extended from the control ferrule for engaging with the peripheral track of the housing and for anchoring the control ferrule to the housing and for preventing the control ferrule from being disengaged from the housing and limiting and guiding the control ferrule to rotate relative to the housing.

The first spring biasing member includes at least one anchor for engaging with the housing and for anchoring the first spring biasing member to the housing. The housing includes at least one cavity formed in the housing for engaging with the anchor of the first spring biasing member.

The second spring biasing member includes at least one anchor for engaging with the housing and for anchoring the second spring biasing member to the housing. The housing includes at least one cavity formed in the housing for engaging with the anchor of the second spring biasing member.

The first spring biasing member includes a seat portion, and the first tongue of the first spring biasing member is extended from the seat portion of the first spring biasing member. The second spring biasing member includes a seat portion, and the second tongue of the second spring biasing member is extended from the seat portion of the second spring biasing member.

The pivotal supporting device includes a barrel engaged into the housing, and the barrel includes a first orifice aligned with the first aperture of the housing for engaging with the first tongue of the first spring biasing member, and a second orifice formed in the barrel and aligned with the second aperture of the housing for engaging with the second tongue of the second spring biasing member.

The barrel includes a peripheral flange engaged with the housing for positioning the barrel to the housing. The housing includes at least one slot formed in the housing, and the barrel includes at least one key engaged with the slot of the housing and for anchoring the barrel to the housing and for preventing the barrel from being rotated relative to the housing and for limiting and guiding the barrel to slide longitudinally relative to the housing only.

Further objectives and advantages of the present invention will become apparent from a careful reading of the detailed description provided hereinbelow, with appropriate reference to the accompanying drawings.

DETAILED DESCRIPTION OF THE
PREFERRED EMBODIMENT

Figure 1:
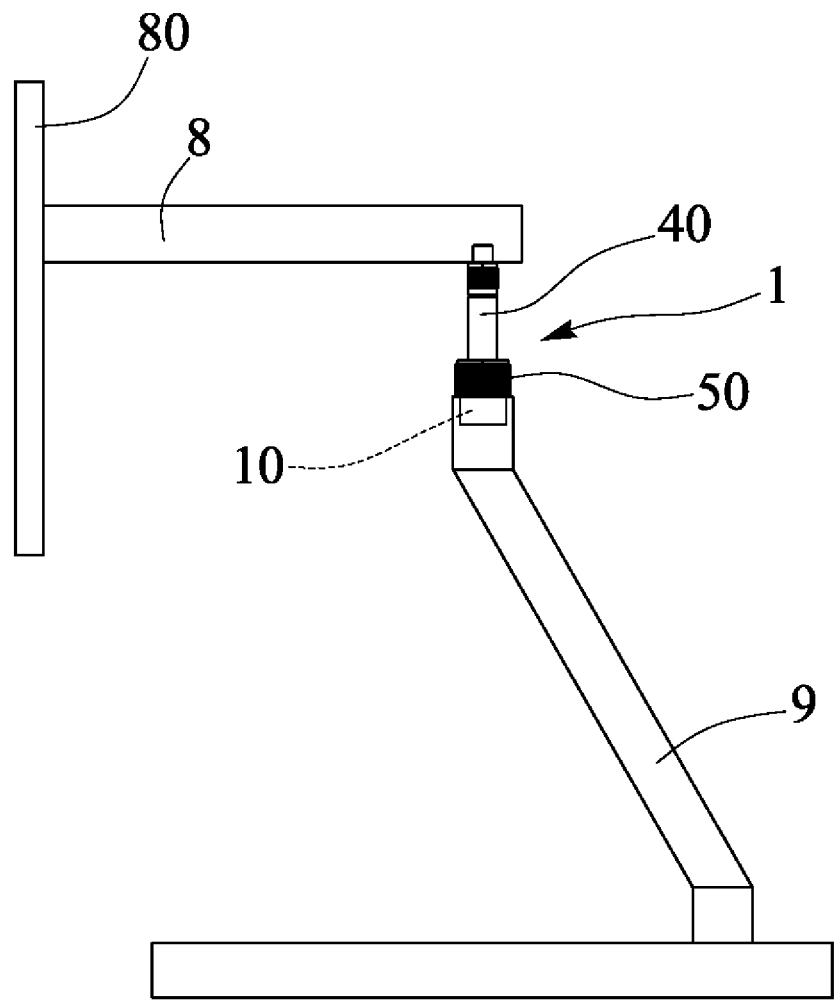
FIG. 1 is a plan schematic view illustrating the operation of the pivotal supporting device in accordance with the present invention for a pivotal supporting system.

Referring to the drawings, and initially to FIG. 1, a pivotal supporting system in accordance with the present invention comprises a pivotal supporting device 1 to be provided or disposed or engaged onto a supporting stand or a supporting base 9 for pivotally supporting a supporting lever or arm 8 and/or a remote member 80, such as a monitor, displayer, portable phone, television, keyboard, or the like.

Figure 2:
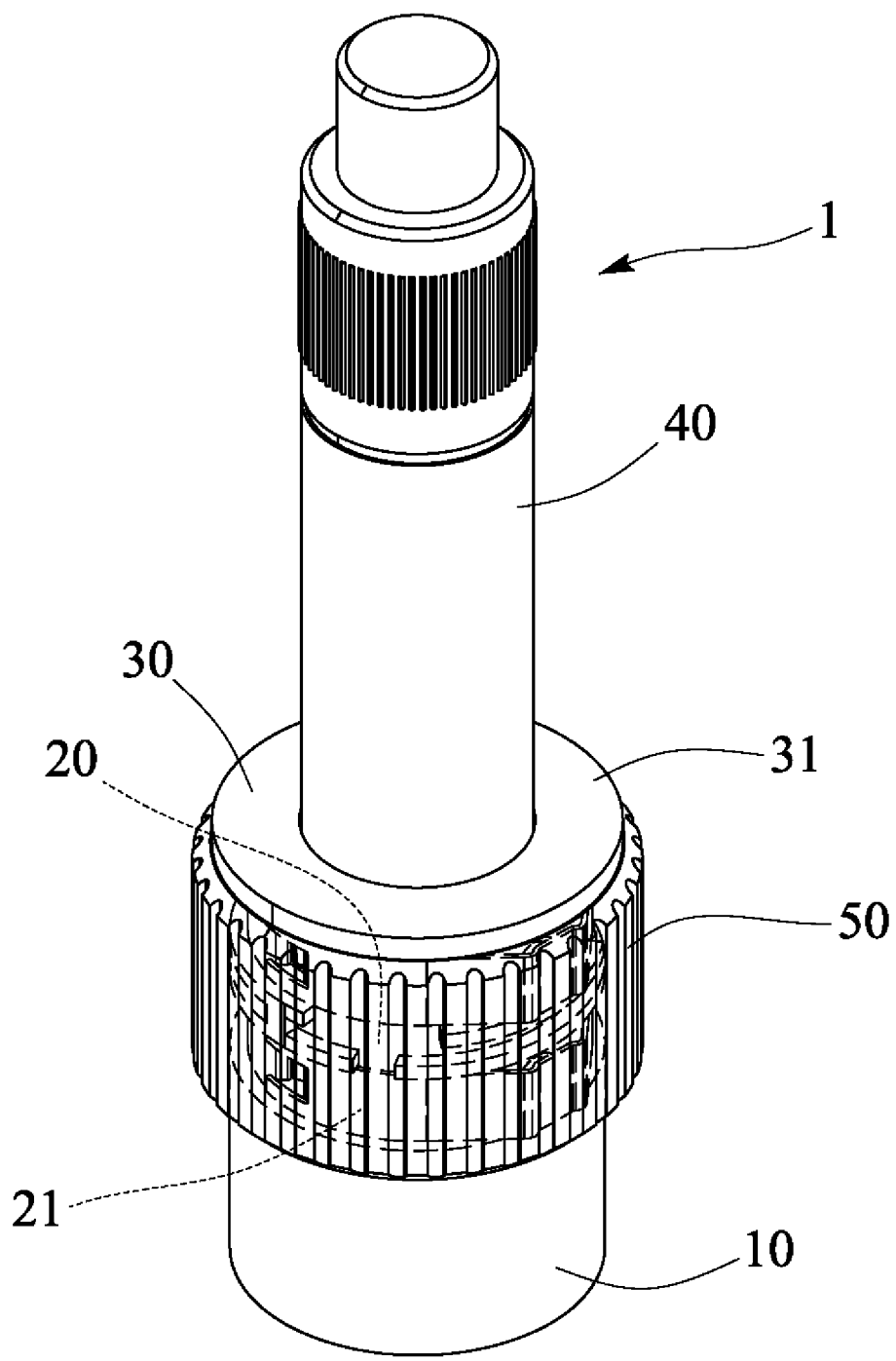
FIG. 2 is a partial perspective view of the pivotal supporting device.
Figure 3:
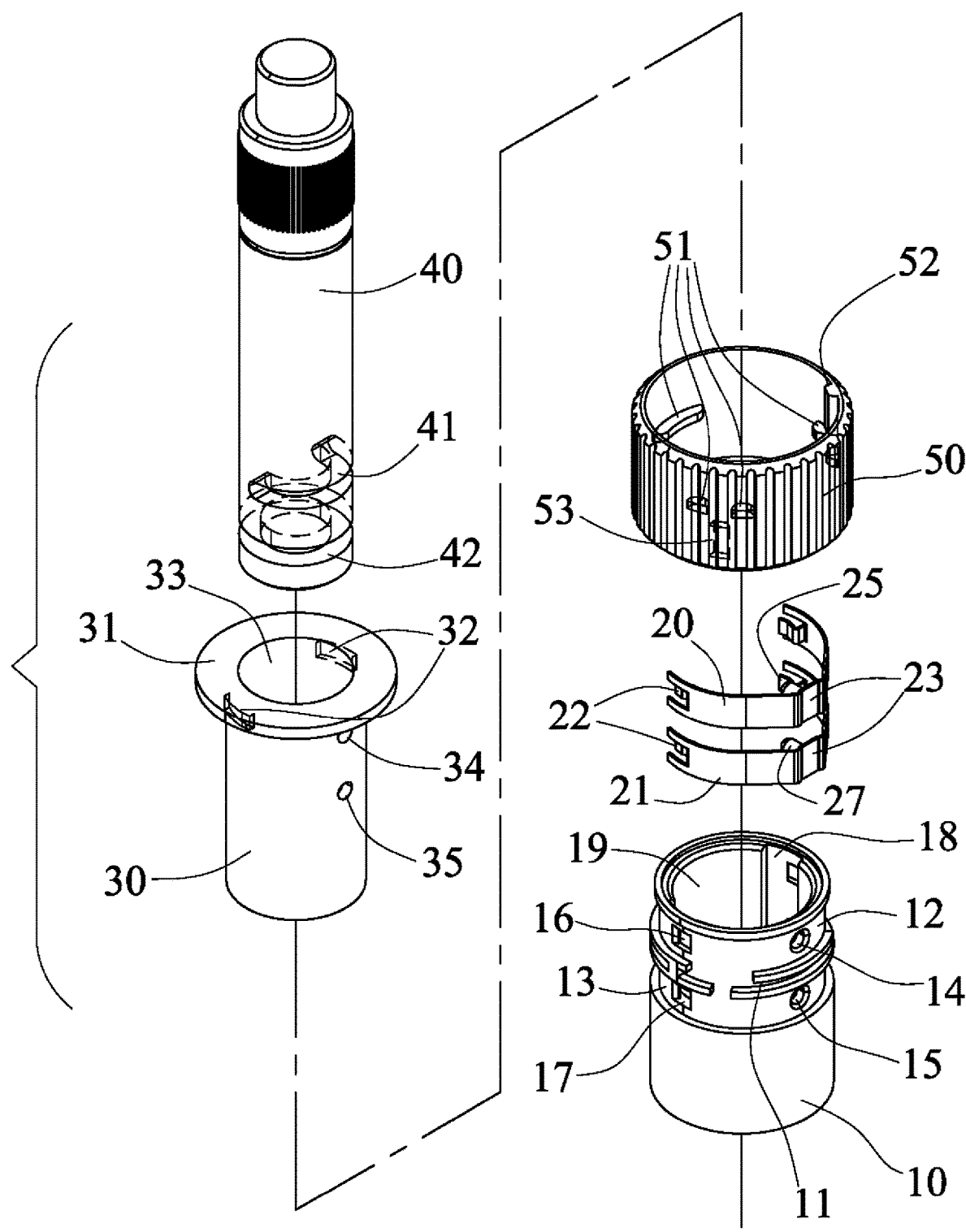
FIG. 3 is a partial exploded view of the pivotal supporting device.
Figure 4:
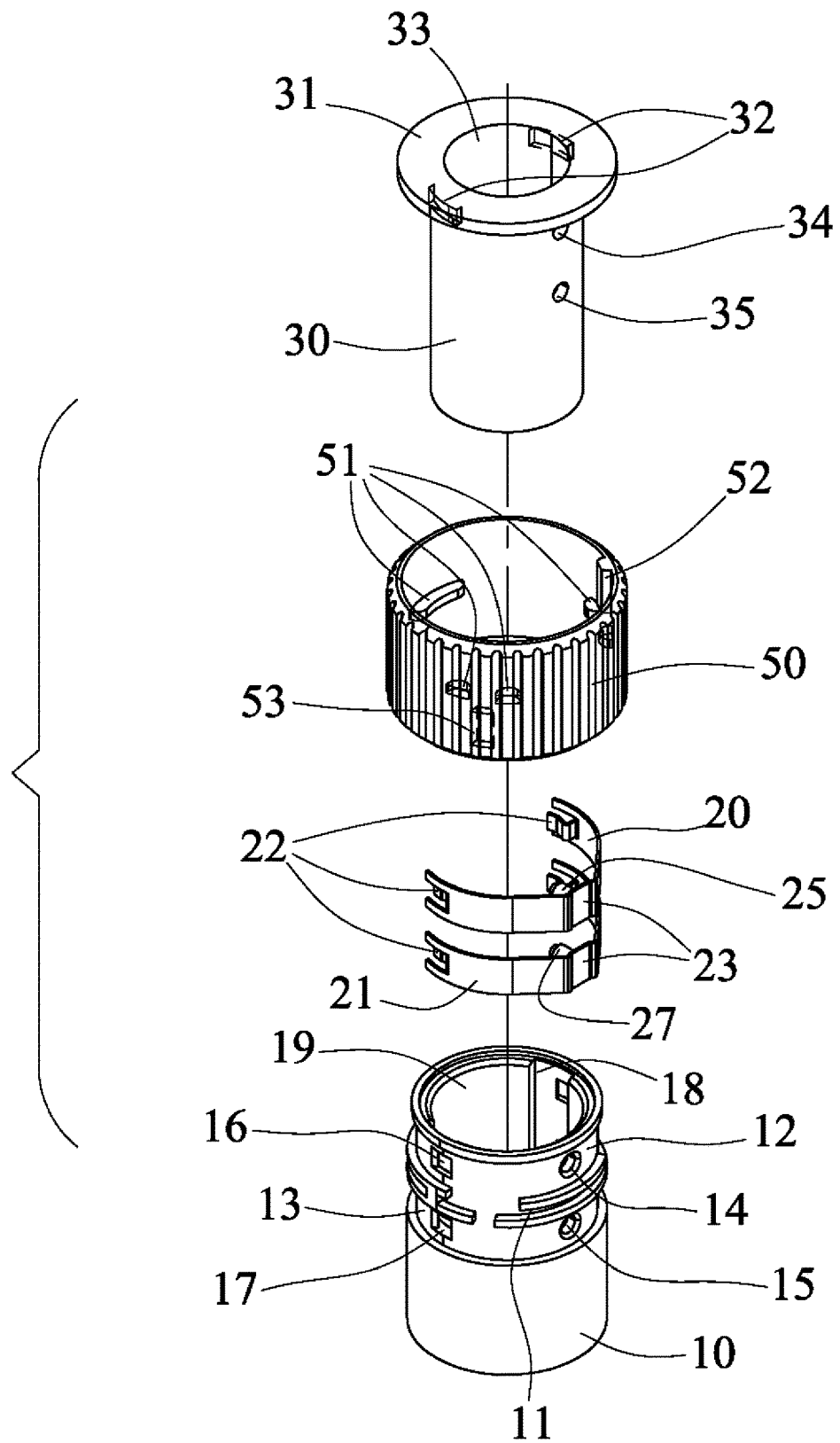
FIG. 4 is another partial exploded view of the pivotal supporting device.
Figure 5:
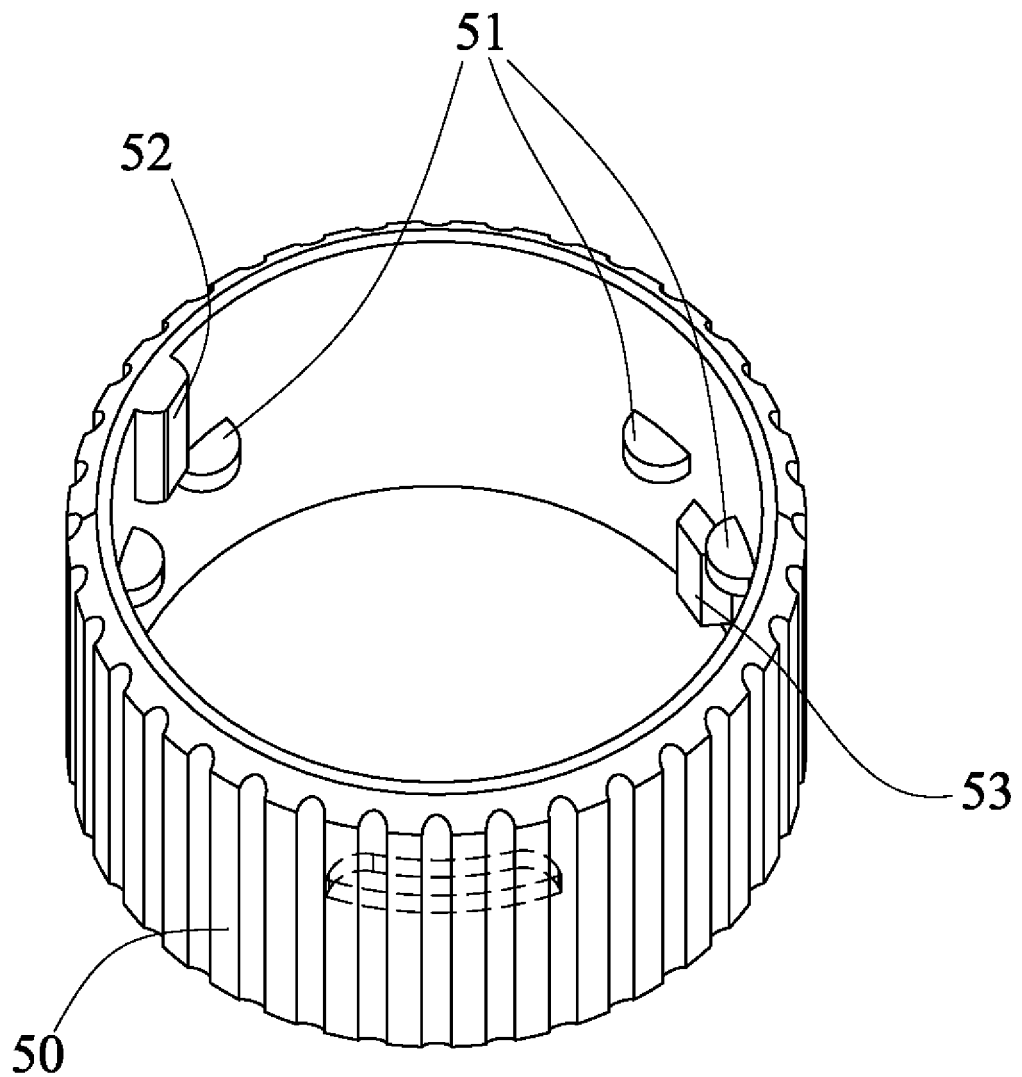
FIG. 5 is another partial perspective view of the pivotal supporting device illustrating a control ferrule of the pivotal supporting device.

As shown in FIGS. 2-4, the pivotal supporting device 1 includes an outer tubular or cylindrical member or housing 10 to be disposed or engaged or secured onto the supporting base 9, the housing 10 includes an annular or peripheral groove or track 11 and one or more (such as two) annular or peripheral recesses 12, 13 formed or provided on the outer peripheral portion thereof and offset or spaced or separated from the peripheral track 11 of the housing 10, for example, the one or first peripheral recess 12 of the housing 10 is formed and arranged or located above the peripheral track 11 and the other or second peripheral recess 13 of the housing 10, but may also be formed and arranged or located below the peripheral track 11 and the other or second peripheral recess 13 of the housing 10.

The housing 10 further includes one or more (such as two) apertures 14, 15 formed therein and communicating with the first and the second peripheral recesses 12, 13 respectively, and further includes one or more (such as four) notches or cavities 16, 17 formed therein and communicating with the first and the second peripheral recesses 12, 13 respectively, it is preferable, but not necessary that the aperture 14, 15 is formed and arranged or located between the respective cavities 16, 17 of the housing 10. The housing 10 further includes one or more (such as two) passages or slots 18 formed therein, such as oppositely formed in the inner peripheral portion of the housing 10 and communicating with the inner compartment or chamber 19 of the housing 10 (FIGS. 3, 4).

Figure 8:
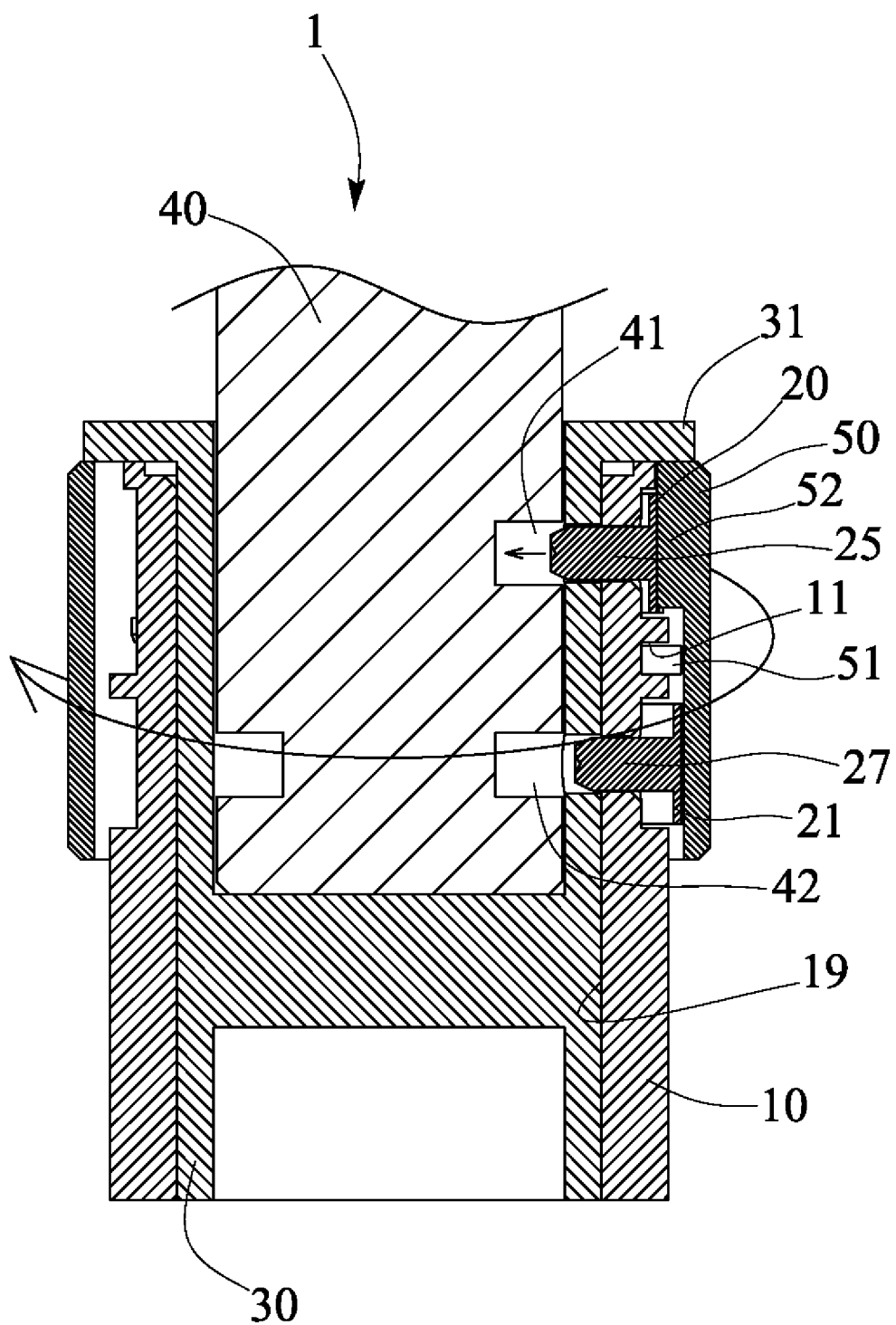
FIGS. 8, 9 are partial cross sectional view of the pivotal supporting device, taken along lines 8-8, and 9-9 of FIGS. 6 and 7 respectively.
Figure 9:
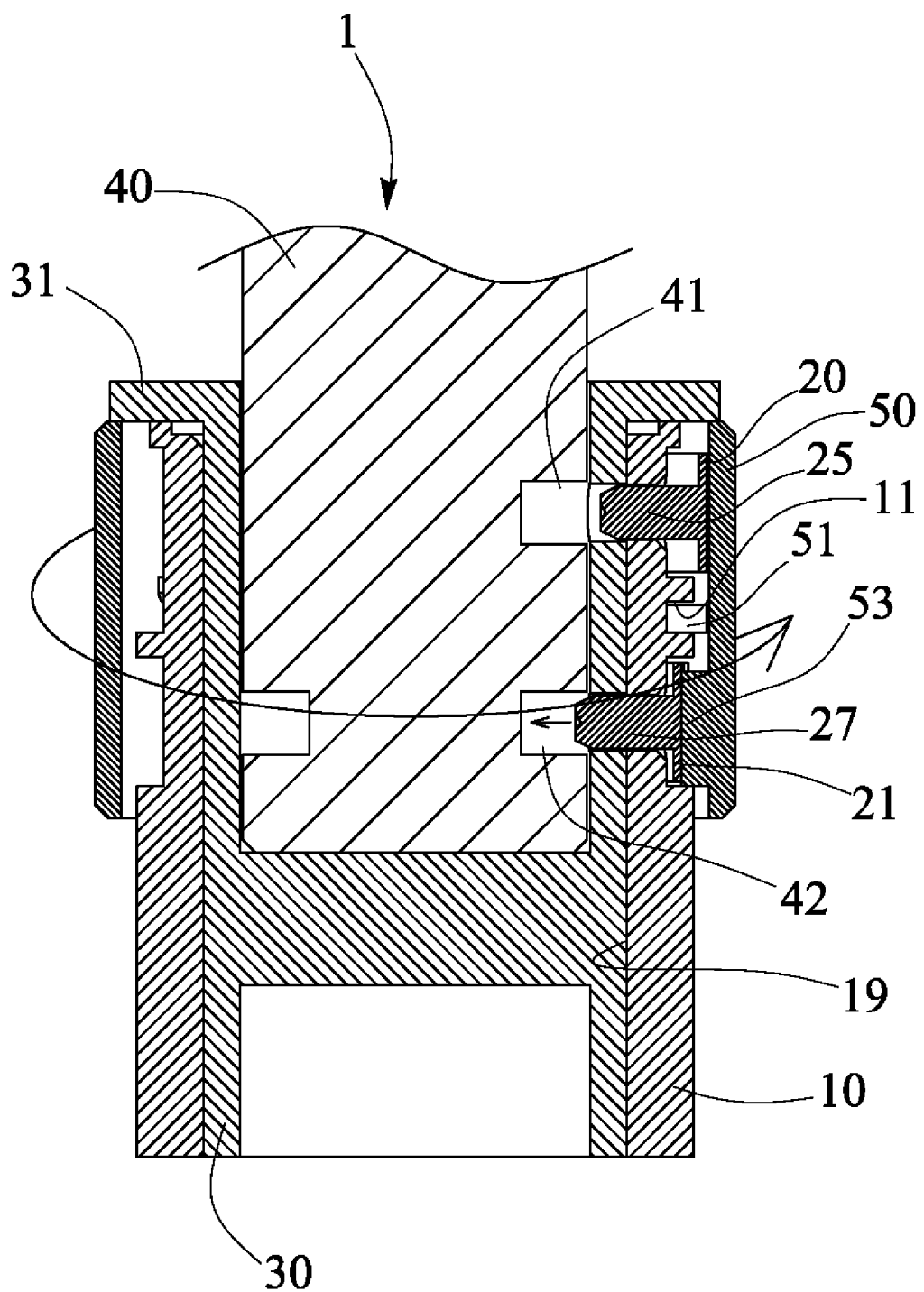

One or more (such as two) spring biasing blades or members 20, 21 are disposed or engaged into the first and the second peripheral recesses 12, 13 respectively, and each include one or more (such as two) latches or catches or anchors 22 formed or provided thereon for engaging with the cavities 16, 17 of the housing 10 respectively and for anchoring or retaining or positioning the spring biasing members 20, 21 to the housing 10 respectively. The first and the second spring biasing members 20, 21 each include a base or seat portion 23 formed or provided formed therein, such as formed on the middle or intermediate portion thereof, and a projection or tongue 25, 27 extended therefrom, such as extended from the respective seat portion 23 for selectively engaging with the aperture 14, 15 of the housing 10 and for resiliently engaging into the inner chamber 19 of the housing 10 (FIGS. 8, 9).

Another tubular or cylindrical member or barrel 30 may further be provided and selectively engaged into the chamber 19 of the housing 10, and includes a peripheral flange 31 extended radially and outwardly therefrom for engaging with the upper portion of the housing 10 (FIGS. 8, 9) and for anchoring or retaining or positioning the barrel 30 to the housing 10 and for preventing the barrel 30 from being moved or engaged into the chamber 19 of the housing 10. The barrel 30 further includes one or more (such as two) protrusions or keys 32 extended radially and outwardly therefrom for engaging with the slots 18 of the housing 10 respectively and for further anchoring or retaining or positioning the barrel 30 to the housing 10 and for preventing the barrel 30 from being pivoted or rotated relative to the housing 10.

The barrel 30 further includes a chamber or compartment 33 formed therein, and further includes one or more (such as two) openings or orifices 34, 35 formed therein and communicating with the chamber 19 of the housing 10, and aligned with the apertures 14, 15 of the housing 10 respectively for selectively receiving or engaging with the tongues 25, 27 of the first and the second spring biasing members 20, 21 respectively. A stem or shank 40 is engageable into the compartment 33 of the barrel 30 and/or the chamber 19 of the housing 10, and includes one or more (such as two) grooves or pathways 41, 42 formed therein and aligned with the first and the second orifices 34, 35 of the barrel 30, and/or aligned with the first and the second apertures 14, 15 of the housing 10 respectively for selectively receiving or engaging with the tongues 25, 27 of the first and the second spring biasing members 20, 21 respectively. Alternatively, without the barrel 30, the shank 40 may also be directly engaged into the chamber 19 of the housing 10.

Figure 6:
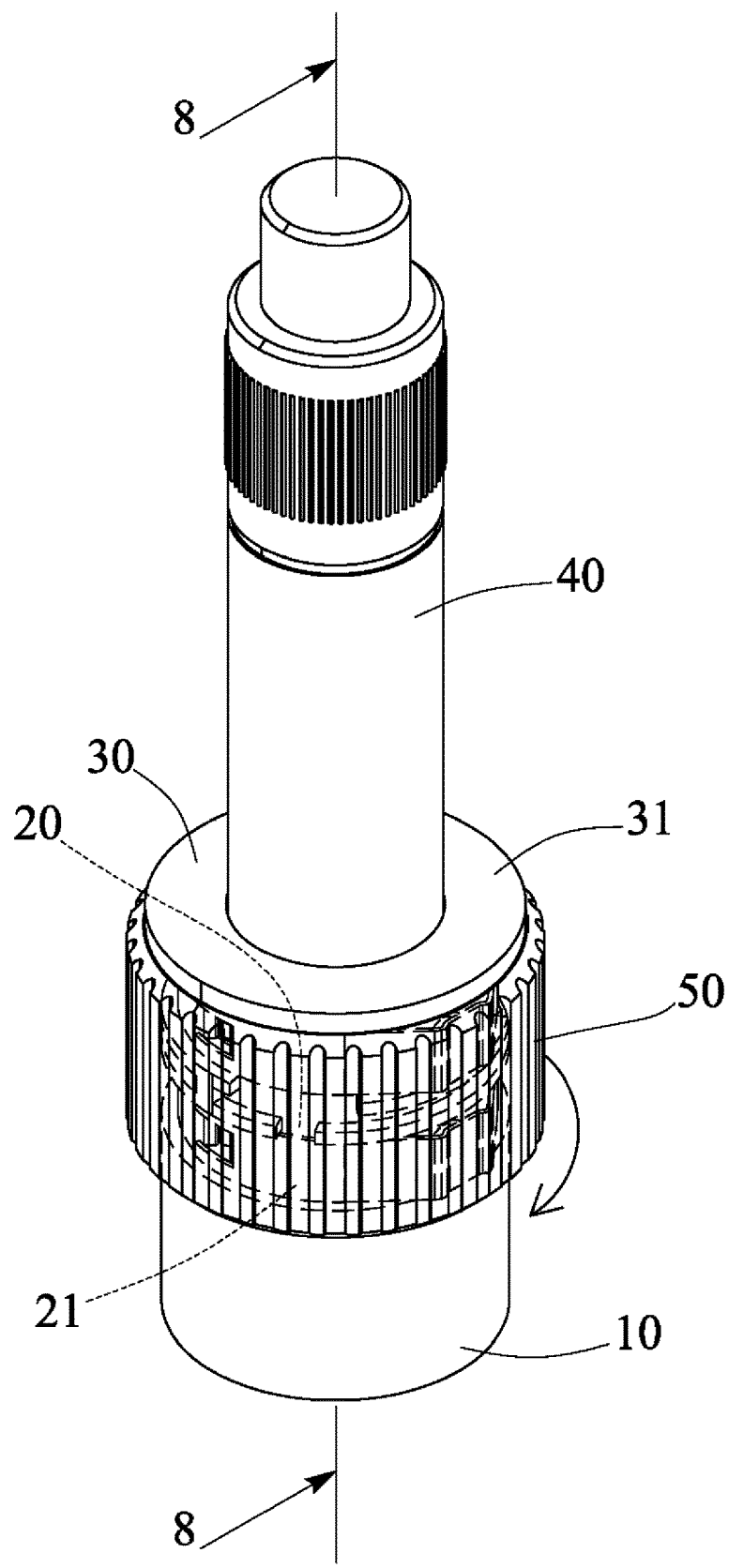
FIGS. 6, 7 are partial perspective views similar to FIG. 2, illustrating the operation of the pivotal supporting device.
Figure 7:
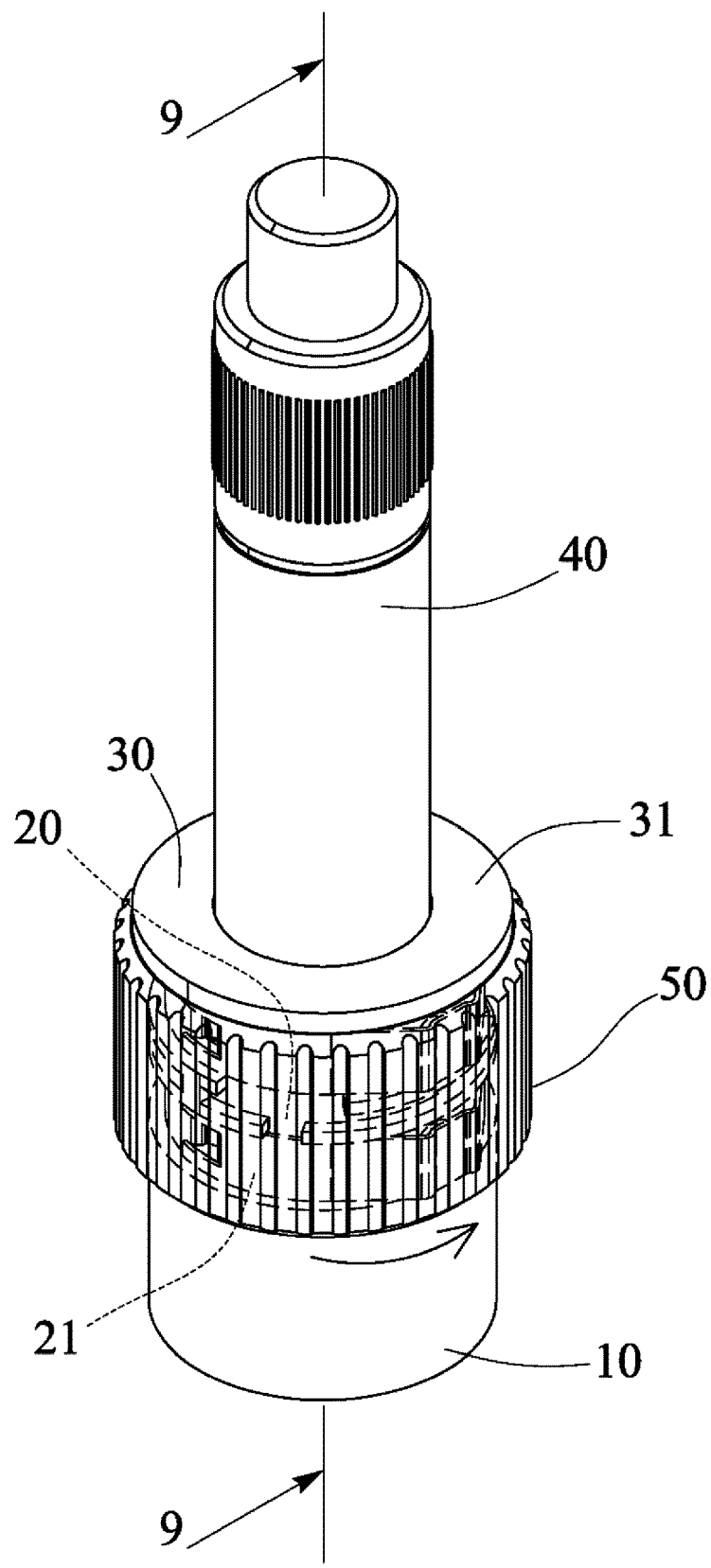

The pathways 41, 42 of the shank 40 include arc lengths different from each other for selectively receiving or engaging with the tongues 25, 27 of the first and the second spring biasing members 20, 21 respectively and for guiding and limiting the shank 40 to pivot or rotate relative to the barrel 30 and/or the housing 10. For example, as shown in FIG. 3, the first pathway 41 of the shank 40 includes an arc length of about one half of the outer peripheral portion of the shank 40 and is smaller than the second pathway 42 of the shank 40 which includes an arc length equals to the outer peripheral portion of the shank 40. In operation, as shown in FIGS. 6 and 8, when the tongue 25 of the first spring biasing member 20 is engaged with the first pathway 41 of the shank 40, the shank 40 is guided or limited to pivot or rotate relative to the barrel 30 and/or the housing 10 for about one half of the circle of the barrel 30 and/or the housing 10. As shown in FIGS. 7 and 9, when the tongue 27 of the second spring biasing member 21 is engaged with the second pathway 42 of the shank 40, the shank 40 is freely rotateable relative to the barrel 30 and/or the housing 10.

A control sleeve or ferrule 50 is pivotally or rotatably engaged onto the housing 10, and includes one or more keys or protrusions 51 extended radially and inwardly therefrom for engaging with the peripheral track 11 of the housing 10 and for pivotally or rotatably anchoring or retaining or positioning the control ferrule 50 to the housing 10 and for preventing the control ferrule 50 from being disengaged or separated from the housing 10. The control ferrule 50 includes a first bulge or projection 52 and a second bulge or projection 53 extended radially and inwardly therefrom and offset from each other for engaging with the first and the second spring biasing members 20, 21 respectively and for forcing or moving the first and the second tongues 25, 27 of the first and the second spring biasing members 20, 21 to engage with the first and the second pathways 41, 42 of the shank 40 respectively.

In operation, when the control ferrule 50 is pivoted or rotated relative to the housing 10 to disengage or to separate the projections 52, 53 of the control ferrule 50 from the seat portions 23 and the tongues 25, 27 of the spring biasing members 20, 21, the tongues 25, 27 of the spring biasing members 20, 21 may be moved and disengaged or separated from the pathways 41, 42 of the shank 40 for allowing the shank 40 to be freely pivoted or rotated relative to the barrel 30 and/or the housing 10. As shown in FIGS. 6 and 8, when the tongue 25 of the first spring biasing member 20 is forced by the first projection 52 of the control ferrule 50 to engage with the first pathway 41 of the shank 40, the shank 40 may be guided or limited to pivot or rotate relative to the barrel 30 and/or the housing 10 for about one half of the circle of the barrel 30 and/or the housing 10. As shown in FIGS. 7 and 9, when the tongue 27 of the second spring biasing member 21 is forced by the second projection 53 of the control ferrule 50 to engage with the second pathway 42 of the shank 40, the shank 40 is freely rotateable relative to the barrel 30 and/or the housing 10.

Accordingly, the pivotal supporting device in accordance with the present invention includes an adjustable structure or configuration for adjusting and/or limiting the pivotal movement of the remote member and the pivotal supporting device relative to the supporting base.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pivotal supporting system for supporting a remote member, said pivotal supporting system comprising:
   a supporting base, and
   a pivotal supporting device disposed on said supporting base for supporting said remote member on said supporting base, said pivotal supporting device including:
   a housing engaged onto said supporting base, said housing including a first aperture and a second aperture formed in said housing,
   a shank engaged into said housing, and said shank including a first pathway and a second pathway formed in said shank and aligned with said first and said second apertures of said housing respectively, said first pathway of said shank including an arc length different from an arc length of said second pathway of said shank,
   a first spring biasing member engaged onto said housing, and said first spring biasing member including a first tongue engaged into said first aperture of said housing for engaging with said first pathway of said shank,
   a second spring biasing member engaged onto said housing, and said second spring biasing member including a second tongue engaged into said second aperture of said housing for engaging with said second pathway of said shank, and
   a control ferrule rotatably engaged onto said housing, and said control ferrule including a first protrusion for engaging with said first spring biasing member and for forcing said first tongue of said first spring biasing member to engage with said first pathway of said shank, and said control ferrule including a second projection for engaging with said second tongue of said second spring biasing member and for forcing said second tongue of said second spring biasing member to engage with said second pathway of said shank.

2. The pivotal supporting system as claimed in claim 1, wherein said housing includes a peripheral track formed in said housing, and said control ferrule includes at least one protrusion extended from said control ferrule for engaging with said peripheral track of said housing and for anchoring said control ferrule to said housing and for preventing said control ferrule from being disengaged from said housing.

3. The pivotal supporting system as claimed in claim 1, wherein said first spring biasing member includes at least one anchor for engaging with said housing and for anchoring said first spring biasing member to said housing.

4. The pivotal supporting system as claimed in claim 3, wherein said housing includes at least one cavity formed in said housing for engaging with said at least one anchor of said first spring biasing member.

5. The pivotal supporting system as claimed in claim 1, wherein said second spring biasing member includes at least one anchor for engaging with said housing and for anchoring said second spring biasing member to said housing.

6. The pivotal supporting system as claimed in claim 5, wherein said housing includes at least one cavity formed in said housing for engaging with said at least one anchor of said second spring biasing member.

7. The pivotal supporting system as claimed in claim 1, wherein said first spring biasing member includes a seat portion, and said first tongue of said first spring biasing member is extended from said seat portion of said first spring biasing member.

8. The pivotal supporting system as claimed in claim 1, wherein said second spring biasing member includes a seat portion, and said second tongue of said second spring biasing member is extended from said seat portion of said second spring biasing member.

9. The pivotal supporting system as claimed in claim 1, wherein said pivotal supporting device includes a barrel engaged into said housing, and said barrel includes a first orifice aligned with said first aperture of said housing for engaging with said first tongue of said first spring biasing member, and a second orifice formed in said barrel and aligned with said second aperture of said housing for engaging with said second tongue of said second spring biasing member.

10. The pivotal supporting system as claimed in claim 9, wherein said barrel includes a peripheral flange engaged with said housing for positioning said barrel to said housing.

11. The pivotal supporting system as claimed in claim 9, wherein said housing includes at least one slot formed in said housing, and said barrel includes at least one key engaged with said at least one slot of said housing and for anchoring said barrel to said housing and for preventing said barrel from being rotated relative to said housing.

* * * * *